United States Patent
Karczewicz et al.

(10) Patent No.: US 11,496,745 B2
(45) Date of Patent: Nov. 8, 2022

(54) BINARIZATION IN TRANSFORM SKIP RESIDUAL CODING

(71) Applicant: QUALCOMM Incorporated, San Diego, CA (US)

(72) Inventors: Marta Karczewicz, San Diego, CA (US); Yung-Hsuan Chao, San Diego, CA (US); Muhammed Zeyd Coban, Carlsbad, CA (US); Hongtao Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/909,892

(22) Filed: Jun. 23, 2020

(65) Prior Publication Data

US 2020/0404286 A1 Dec. 24, 2020

Related U.S. Application Data

(60) Provisional application No. 62/865,883, filed on Jun. 24, 2019, provisional application No. 62/894,449, filed on Aug. 30, 2019.

(51) Int. Cl.
*H04N 19/14* (2014.01)
*H04N 19/70* (2014.01)
(Continued)

(52) U.S. Cl.
CPC .......... *H04N 19/14* (2014.11); *H04L 65/70* (2022.05); *H04L 65/75* (2022.05); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

2012/0328004 A1* 12/2012 Coban ............... H04N 19/90
375/240.03
2013/0051457 A1* 2/2013 Joshi ............... H04N 19/61
375/240.03
(Continued)

FOREIGN PATENT DOCUMENTS

WO 2015006602 A2 1/2015

OTHER PUBLICATIONS

Bross et al., "Versatile Video Coding (Draft 5)," Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, KP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019].

(Continued)

*Primary Examiner* — Samuel D Fereja
(74) *Attorney, Agent, or Firm* — Shumaker & Sieffert, P.A.

(57) ABSTRACT

A video decoder can be configured to determine that a block of video data is encoded without transforming residual data for the block; determine a quantization parameter for the block of video data; based on the determined quantization parameter, determine a range for levels of quantized residual values of the block; divide the range into k intervals, wherein k is an integer value; determine a level for a quantized residual value of the block based on the k intervals by receiving information indicating the level for the quantized residual value is within a particular interval of the k intervals, receiving information indicating a difference value that represents a difference between a reference level value for the particular interval and the level for the quantized residual value of the block, and based on the reference level (Continued)

value and the difference value, determining the level for the quantized residual value.

60 Claims, 8 Drawing Sheets

(51) Int. Cl.
*H04N 19/176* (2014.01)
*H04N 19/46* (2014.01)
*H04L 65/70* (2022.01)
*H04L 65/75* (2022.01)

(56) References Cited

U.S. PATENT DOCUMENTS

| | | | | |
|---|---|---|---|---|
| 2015/0016537 | A1* | 1/2015 | Karczewicz | H04N 19/136 375/240.18 |
| 2016/0295214 | A1 | 10/2016 | Gamei et al. | |
| 2021/0211673 | A1* | 7/2021 | Schwarz | H04N 19/91 |

OTHER PUBLICATIONS

Bross (Fraunhofer) B, et al., "Non-CE8: Unified Transform Type Signalling and Residual Coding for Transform Skip," 13. JVET Meeting, Jan. 9, 2019-Jan. 18, 2019, Marrakech, (The Joint Video Exploration Team of ISO/IEC JTC1/SC29/WG11 and ITU-TSG. 16), No. JVET-M0464, Jan. 15, 2019 (Jan. 15, 2019), XP030202239, 13 pages, Retrieved from the Internet: URL: http://phenix.int-evry.fr/jvet/doc_end_user/documents/13_Marrakech/wg11/JVET-M0464-v4.zip JVET-M0464-v4.docx, p. 4.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/, No. JVET-A1001, Feb. 24, 2016 (Feb. 24, 2016), XP030150000, 27 Pages.

"Golomb Coding," Wikipedia, Jun. 1, 2019 (Jun. 1, 2019), XP002800265, 8 Pages, Retrieved from the Internet: URL: https://en.wikipedia.org/w/index.php?title=Golomb_coding&oldid=899776739 [retrieved on Sep. 10, 2020].

International Search Report and Written Opinion—PCT/US2020/039281—ISA/EPO—dated Sep. 29, 2020 17 Pages.

Karczewicz, M., et al., "CE8-related: Quantized Residual BDPCM," JVET-N0413-r3, Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-6.

Karczewicz (Qualcomm) M., et al., "CE7-2.2: QP Dependent Binarization in TS Residual Coding," 16.JVET Meeting, Oct. 1, 2019-Oct. 11, 2019, Geneva, (The Joint Video Exploration Team of ISO/IEC JTC 1/SC29/WG11 and ITU-T SG.16), No. JVET-P0076 Sep. 18, 2019 (Sep. 18, 2019), XP030216172, pp. 1-10, Retrieved from the Internet: URL: http://phenix.int-evry.fr/jvet/doc_end_user/documents/16_Gothenburg/wg11/JVET-P0876-v1.zip JVET-P0076-v1/JVET-P0076-v1.docx [retrieved on Sep. 18, 2019].

Karczewicz (Qualcomm) M., et al., "CE7-Related: QP Dependent Binarization in TS Residual Coding," 15.JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0559, Jul. 4, 2019 (Jul. 4, 2019), XP030219904, pp. 1-6, Retrieved from the Internet URL:http://phenix.int-evry.fr/jvet/doc_end_user/documents/15_Gothenburg/wg11/JVET-O0559-v3.zip JVET-O0559-v3/JVET-O0559-v1.docx [retrieved on Jul. 4, 2019].

Karczewicz, M et al., "CE7-related: Alternative Method to RDPCM with TS Level Mapping," JVET-O0556, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-3.

Schwarz A., et al., "Description of Core Experiment 7 (CE 7): Quantization and Coefficient Coding," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1027-V4, pp. 1-16.

Karczewicz, M et al., "CE7: Sign Context, Level Mapping, and Bitplane Coding for TS Residual Coding (CE7-3.7, CE7-3.8, CE7-3.9, CE7-3.10, and CE7-3.11)," JVET-O0122-v3, Joint Video Experts Team (JVET) of ITU-T SG 16 NP3 and ISO/IEC JTC 1/SC 29/WG 11, 15th Meeting, Gothenburg, SE, Jul. 3-12, 2019, pp. 1-22.

Schwarz A., et al., "Description of Core Experiment 7 (CE 7): Quantization and Coefficient Coding," Joint Video Experts Team (JVET) of ITU-T SG 16 WP 3 and ISO/IEC JTC 1/SC 29/WG 11, 15th Meeting, Gothenburg, SE, Jul. 3-12, 2019, Document: JVET-O2027-v3, pp. 1-13.

* cited by examiner

BINARIZATION IN TRANSFORM SKIP RESIDUAL CODING

This application claims the benefit of
U.S. Provisional Patent Application 62/865,883, filed 24 Jun. 2019, and
U.S. Provisional Patent Application 62/894,449, filed 30 Aug. 2019, the entire content of both being hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques related to the binarization performed in transform skip residual coding. More specifically, this disclosure describes techniques related to an entropy decoding process that converts a binary representation to a series of non-binary valued quantized coefficients. The corresponding entropy encoding process, which is the reverse process of entropy decoding, is also described herein.

According to the techniques of this disclosure, a binarization process is described for coding transform skip coefficients. For an input quantization parameter (QP), a video decoder can derive the corresponding dynamic range [0, maxTsLevel] for levels of a transform skip coefficient, where "maxTsLevel" represents the maximum possible level of a transform skip coefficient, i.e., the maximum possible level of a quantized residual value, that is allowed for a specific QP value. The maximum possible level for a transform skip coefficient for a block may be a function of the QP value for the block but may also depend on the bit depth for the block. A video decoder may then receive an index, or some other indication, of the interval that includes the level of the value for the transform skip coefficient. The video decoder may additionally receive a remainder value representing a difference between an initial value of the interval that includes the level of the value for the transform skip coefficient and the actual level value for the transform skip coefficient.

According to one example of this disclosure, a method of decoding video data includes determining that a block of video data is encoded without transforming residual data for the block; determining a quantization parameter for the block of video data; based on the determined quantization parameter, determining a range for levels of quantized residual values of the block of video data; dividing the range into k intervals, wherein k is an integer value; determining a level for a quantized residual value of the block based on the k intervals, wherein determining the level for the quantized residual value of the block based on the k intervals comprises: receiving information indicating the level for the quantized residual value is within a particular interval of the k intervals; receiving information indicating a difference value, wherein the difference value represents a difference between a reference level value for the particular interval and the level for the quantized residual value of the block; and based on the reference level value and the difference value, determining the level for the quantized residual value; and outputting decoded video data based on the level for the quantized residual value.

According to another example of this disclosure, a device for decoding video data includes a memory configured to store video data and one or more processors configured to determine that a block of video data is encoded without transforming residual data for the block; determine a quantization parameter for the block of video data; based on the determined quantization parameter, determine a range for levels of quantized residual values of the block of video data; divide the range into k intervals, wherein k is an integer value; determine a level for a quantized residual value of the block based on the k intervals, wherein to determine the level for the quantized residual value of the block based on the k intervals, the one or more processors are further configured to receive information indicating the level for the quantized residual value is within a particular interval of the k intervals; receive information indicating a difference value, wherein the difference value represents a difference between a reference level value for the particular interval and the level for the quantized residual value of the block; and based on the reference level value and the difference value, determine the level for the quantized residual value; and output decoded video data based on the level for the quantized residual value.

According to another example of this disclosure, a computer readable storage medium storing instructions that when executed by one or more processors cause the one or more processors to determine that a block of video data is encoded without transforming residual data for the block; determine a quantization parameter for the block of video data; based on the determined quantization parameter, determine a range for levels of quantized residual values of the block of video data; divide the range into k intervals, wherein k is an integer value; determine a level for a quantized residual value of the block based on the k intervals, wherein to determine the level for the quantized residual value of the block based on the k intervals, the instructions cause the one or more processors to receive information indicating the level for the quantized residual value is within a particular interval of the k intervals; receive information indicating a difference value, wherein the difference value represents a difference between a reference level value for the particular interval and the level for the quantized residual value of the block; and based on the reference level value and the difference value, determine the level for the quantized residual value; and output decoded video data based on the level for the quantized residual value.

According to another example, an apparatus for decoding video data includes means for determining that a block of video data is encoded without transforming residual data for the block; means for determining a quantization parameter for the block of video data; means for determining a range for levels of quantized residual values of the block of video data based on the determined quantization parameter; means for dividing the range into k intervals, wherein k is an integer value; means for determining a level for a quantized residual value of the block based on the k intervals, wherein the means for determining the level for the quantized residual value of the block based on the k intervals comprises means for receiving information indicating the level for the quantized residual value is within a particular interval of the k intervals; means for receiving information indicating a difference value, wherein the difference value represents a difference between a reference level value for the particular interval and the level for the quantized residual value of the block; and means for determining the level for the quantized residual value based on the reference level value and the difference value; and means for outputting decoded video data based on the level for the quantized residual value.

According to another example of this disclosure, a method of generating a bitstream of encoded video data includes determining that a block of video data is encoded without transforming residual data for the block; determining a level for a quantized residual value of the block; determining a quantization parameter for the block of video data; based on the determined quantization parameter, determining a range for levels of quantized residual values of the block of video data; dividing the range into k intervals, wherein k is an integer value; determining a particular interval of the k intervals that includes the level for the quantized residual value; determining a difference value, wherein the difference value represents a difference between a reference level value for the particular interval and the level for the quantized residual value of the block; signaling the level for the quantized residual value of the block based on the k intervals, wherein signaling the level for the quantized residual value of the block based on the k intervals comprises: generating, for inclusion in the bitstream of encoded video data, one or more syntax elements indicating the particular interval; generating, for inclusion in the bitstream of encoded video data, a syntax element indicating the difference value; and outputting the bitstream of encoded video data.

According to another example of this disclosure, a device for encoding video data includes a memory configured to store video data and one or more processors configured to determine that a block of video data is encoded without transforming residual data for the block; determine a level for a quantized residual value of the block; determine a quantization parameter for the block of video data; based on the determined quantization parameter, determine a range for levels of quantized residual values of the block of video data; divide the range into k intervals, wherein k is an integer value; determine a particular interval of the k intervals that includes the level for the quantized residual value; determine a difference value, wherein the difference value represents a difference between a reference level value for the particular interval and the level for the quantized residual value of the block; signal the level for the quantized residual value of the block based on the k intervals, wherein to signal the level for the quantized residual value of the block based on the k intervals the one or more processors are further configured to generate, for inclusion in the bitstream of encoded video data, one or more syntax elements indicating the particular interval; generate, for inclusion in the bitstream of encoded video data, a syntax element indicating the difference value; and output the bitstream of encoded video data.

According to another example of this disclosure, a computer readable storage medium storing instructions that when executed by one or more processors cause the one or more processors to determine that a block of video data is encoded without transforming residual data for the block; determine a level for a quantized residual value of the block; determine a quantization parameter for the block of video data; based on the determined quantization parameter, determine a range for levels of quantized residual values of the block of video data; divide the range into k intervals, wherein k is an integer value; determine a particular interval of the k intervals that includes the level for the quantized residual value; determine a difference value, wherein the difference value represents a difference between a reference level value for the particular interval and the level for the quantized residual value of the block; signal the level for the quantized residual value of the block based on the k intervals, wherein to signal the level for the quantized residual value of the block based on the k intervals the one or more processors are further configured to generate, for inclusion in the bitstream of encoded video data, one or more syntax elements indicating the particular interval; generate, for inclusion in the bitstream of encoded video data, a syntax element indicating the difference value; and output the bitstream of encoded video data.

According to another example of this disclosure, an apparatus for generating a bitstream of encoded video data includes means for determining that a block of video data is encoded without transforming residual data for the block; means for determining a level for a quantized residual value of the block; means for determining a quantization parameter for the block of video data; means for determining a range for levels of quantized residual values of the block of video data based on the determined quantization parameter; means for dividing the range into k intervals, wherein k is an integer value; means for determining a particular interval of the k intervals that includes the level for the quantized residual value; means for determining a difference value, wherein the difference value represents a difference between a reference level value for the particular interval and the level for the quantized residual value of the block; means for signaling the level for the quantized residual value of the block based on the k intervals, wherein the means for signaling the level for the quantized residual value of the block based on the k intervals comprises means for generating, for inclusion in the bitstream of encoded video data, one or more syntax elements indicating the particular interval; means for generating, for inclusion in the bitstream of encoded video data, a syntax element indicating the difference value; and means for outputting the bitstream of encoded video data.

The details of one or more examples are set forth in the accompanying drawings and the description below. Other features, objects, and advantages will be apparent from the description, drawings, and claims.

DETAILED DESCRIPTION

Figure 1:
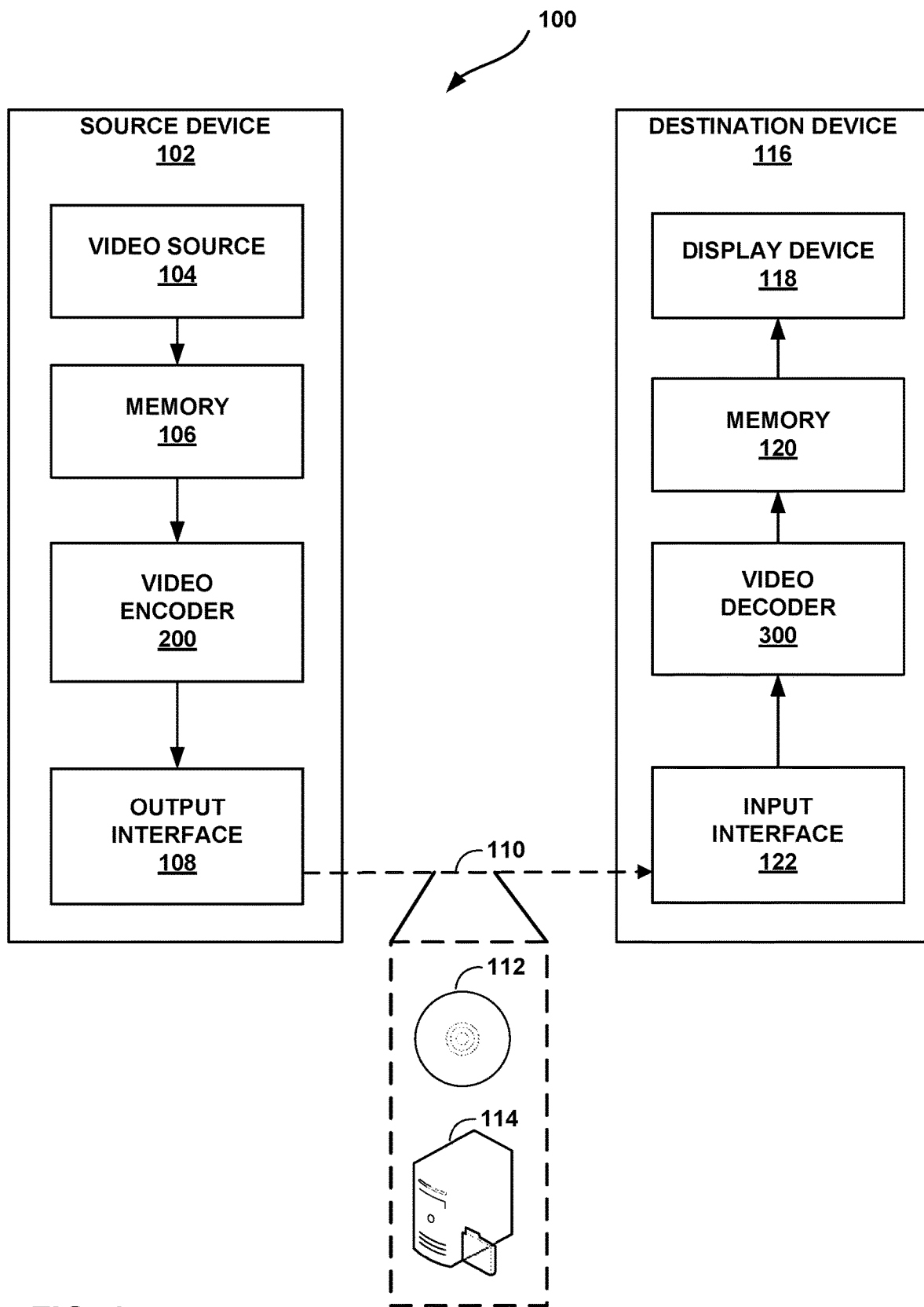
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder may transform and quantize the residual data and signal the transformed and quantized residual data in the encoded bitstream.

A video decoder decodes and adds the residual data to the prediction block to produce a reconstructed video block that matches the original video block more closely than the prediction block alone. The compression achieved by the transform and quantization processes may be lossy, meaning that the transform and quantization processes may introduce distortion into the decoded video data. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

In some coding scenarios, a video encoder may encode a block of video data in a transform skip mode in which the transform process described above is not performed, i.e., the transform process is skipped. Thus, for a block encoded in a transform skip mode, the residual data is not transformed, but may still be quantized. Thus, a transform skip coefficient generally corresponds to a quantized representation of a residual value, whereas a transform coefficient generally corresponds to a residual value of a block that has been both quantized and transformed to generate a transform coefficient. As used in this disclosure, the term coefficients may refer to either a transform coefficient or a transform skip coefficient and may be either quantized or unquantized.

This disclosure describes techniques related to the binarization performed in transform skip residual coding. More specifically, this disclosure describes techniques related to an entropy decoding process that converts a binary representation to a series of non-binary valued quantized coefficients. The corresponding entropy encoding process, which is the reverse process of entropy decoding, is also described herein. In the following disclosure, when a video decoder is described as receiving or parsing a syntax element, it can be assumed that a video encoder is configured to signal, e.g., generate for inclusion in a bitstream of encoded video data, that same syntax element. Similarly, when a video encoder is described as signaling a syntax element, it can be assumed that a video decoder is configured to receive and parses that same syntax element.

According to the techniques of this disclosure, a binarization process is described for coding transform skip coefficients. For an input quantization parameter QP, a video decoder can derive the corresponding dynamic range [0, maxTsLevel] of a level of a transform skip coefficient, where "maxTsLevel" represents the maximum level of a transform skip coefficient, i.e., the maximum level of a quantized residual value. In this context, "level" refers to a magnitude or absolute value of the quantized residual value.

According to one example technique of this disclosure, once the dynamic range of the level of the transform skip coefficient is calculated, the range can be divided into k (inclusive) intervals, as follows:

$$[X, t_0], [t_0+1, t_1], [t_1+1, t_2], \ldots [t_{k-3}+1, t_{k-2}], [t_{k-2}+1, \text{maxTsLevel}].$$

In the example above, X represents a minimum value for interval 0. As discussed later in this disclosure, in different implementations, X may be equal to 0, 1, 2, or some other value. The k intervals may have indexes ranging from 0 to k−1. Again, referring to the example above, index 0 corresponds to the interval $[X, t_0]$, index 1 corresponds to the interval $[t_0+1, t_1]$, and so on up to index k−1 which corresponds to interval $[t_{k-2}+1, \text{maxTsLevel}]$. In the example above, $t_n$ represents an upper threshold for the n-th interval, wherein n ranges from 0 to k−1.

A video decoder may then receive an index, or some other indication, of the interval that includes the level of the value for the transform skip coefficient. The video decoder may additionally receive a remainder value representing a difference between an initial value of the interval that includes the level of the value for the transform skip coefficient and the actual level value for the transform skip coefficient. As one example, if Y represents the actual level of the value of the transform skip coefficient and Y is within interval 2, then the remainder value is equal to $Y-(t_1+1)$.

In some examples, the video decoder may receive, before receiving the indication of the interval, a significant coefficient flag, indicating if the transform skip coefficient is equal to zero or not equal to zero. In such an example, the value of X in the first interval may be equal to 1. In some examples, the video decoder may also receive, before receiving the indication of the interval, a greater than one flag, indicating if the level of the transform skip coefficient is equal to 1 or greater than 1. In such an example, the value of X in the first interval may be equal to 2. The video decoder may additionally receive a flag indicating if the actual value for the transform skip coefficient is negative or positive.

The distribution of values of transform coefficients in a transform block tends to be quite different than the distribution of values of transform skip coefficients in a block that is not transformed. For example, almost all the transform coefficients in the bottom-right half of a transform block may be equal to zero. Only a few transform coefficients near the top-left corner of the block may have larger values, e.g., greater than two, while some transform coefficients between the top-left corner of the transform and the bottom-left half of the block may have small values, e.g., 1 or 2. Existing techniques for coding coefficients are generally designed to exploit the high number of zeros, as well as the prevalence of ones and twos, found in a transform block, which may present potential problems when coding blocks in a transform skip mode.

In contrast to a transform block, a transform skip block has relatively few zero values, and to the extent a transform skip value does have zero values, those zero values tend to not be clustered into a specific region of the transform skip block. Accordingly, coefficient coding techniques designed for coding transform blocks tend to not be as efficient when coding transform skip blocks. By dividing a range of transform skip coefficient levels into k intervals and receiving one or more syntax values indicating to which of the k intervals the level for the quantized residual value is within, and receiving a syntax element indicating a difference between a reference level value for the interval that the level for the quantized residual value is within and the actual level for the quantized residual value of the block, a video decoder configured according to the techniques of this disclosure may produce the advantage of achieving better coding efficiency when coding transform skip blocks compared to existing coefficient coding techniques. The reference level may, for example, be the lowest value included in the interval, but other reference values such as the highest value in the interval or any other value in the interval could also be used as the reference level.

The techniques of this disclosure may be applied to any of the existing video codecs, such as High Efficiency Video Coding (HEVC), or be proposed as a promising coding tool to the standard currently being developed, such as Versatile Video Coding (VVC), and to other future video coding standards.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including a desktop computer, notebook (i.e., laptop) computer, tablet computer, set-top box, a telephone handset such as a smartphone, television, camera, display device, digital media player, video gaming console, video streaming device, or the like. In some cases, source device 102 and destination device 116 may be equipped for wireless communication in accordance with a wireless communication standard, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling residual data for transform skip blocks.

Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling residual data for transform skip blocks. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding, or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

Although the above describes examples where transforms are preformed, in some examples, the transform may be skipped. For instance, video encoder 200 may implement transform skip mode in which the transform operation is skipped. In examples where transform is skipped, video encoder 200 may output coefficients corresponding to residual values instead of transform coefficients. The coefficients corresponding to residual values may, for example, correspond to quantized residual values. In the following description, the term "coefficient" should be interpreted to include either coefficients corresponding to residual values or transform coefficients generated from the result of a transform.

As noted above, video encoder 200 may perform quantization of the transform coefficients or the residual values. Quantization generally refers to a process in which values are quantized to possibly reduce the amount of data used to represent the values, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the coefficients, producing a one-dimensional vector from the two-dimensional matrix including the quantized coefficients. For transform coefficients, the scan may be designed to place higher energy (and therefore lower frequency) coefficients at the front of the vector and to place lower energy (and therefore higher frequency) transform coefficients at the back of the vector. For transform skip coefficients, the same or a different scan may be used. In some examples, video encoder 200 may utilize a predefined scan order to scan the quantized coefficients to produce a serialized vector, and then entropy encode the quantized coefficients of the vector. In other examples, video encoder 200 may perform an adaptive scan. After scanning the quantized coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented, for example, by quantized transform coefficients or quantized transform skip coefficients. Video decoder 300 may inverse quantize and, if coded in a transform mode, inverse transform the quantized coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with techniques of this disclosure, video encoder 200 may be configured to determine that a block of video data is encoded in a transform skip mode, determine a level for a quantized residual value of the block, and determine a quantization parameter for the block of video data. Video encoder 200 may be configured to determine, based on the determined quantization parameter, a range for levels of quantized residual values of the block of video data and divide the range into k intervals, with k representing an integer value. Video encoder 200 may determine which of the k intervals the level for the quantized residual value is within and then determine a difference value representing a difference between a reference level value for the interval that the level for the quantized residual value is within and the level for the quantized residual value of the block. Video encoder 200 may be configured to signal the level for the quantized residual value of the block based on the k intervals by generating, for inclusion in the bitstream of encoded video data, one or more syntax elements indicating the interval that the level for the quantized residual value is within and a syntax element indicating the difference value.

In accordance with techniques of this disclosure, video decoder 300 may be configured to determine that a block of video data is encoded in a transform skip mode and determine a quantization parameter for the block of video data. Video decoder 300 may determine, based on the determined quantization parameter, a range for levels of quantized residual values of the block of video data and divide the range into k intervals, with k representing an integer value. Video decoder 300 may determine a level for a quantized residual value of the block based on the k intervals by receiving one or more syntax elements indicating which of the k intervals the level for the quantized residual value is within, receiving a syntax element indicating a difference value, wherein the difference value represents a difference between a reference level value for the interval that the level for the quantized residual value is within and the level for the quantized residual value of the block, and based on the reference level value and the difference value, determining the level for the quantized residual value.

By signaling a level for a quantized residual value based on which of k intervals the level for the quantized residual value is within and a difference value representing a difference between a reference level value for the interval that the level for the quantized residual value is within and the level for the quantized residual value of the block, video encoder 200 and video decoder 300 may entropy code quantized residual values for blocks coded in transform skip mode using fewer bits when compared to existing techniques for coding quantized residual values. By entropy coding quantized residual values for blocks coded in transform skip mode using fewer bits, video encoder 200 and video decoder 300 may achieve better compression without adding any additional distortion, thus improving the rate distortion tradeoffs of the coded video data.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
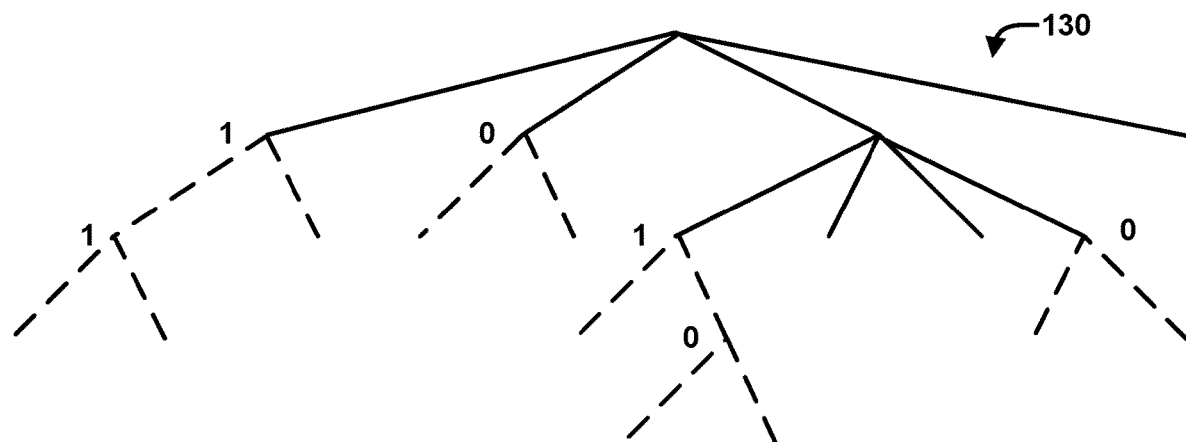
FIGS. 2A and 2B are conceptual diagrams illustrating an example quadtree binary tree (QTBT) structure, and a corresponding coding tree unit (CTU).
Figure 2B:
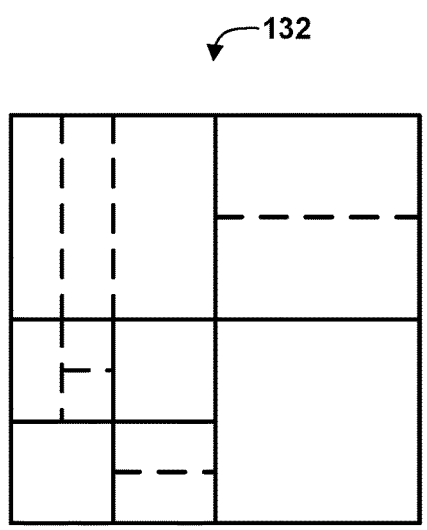

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

This disclosure describes techniques related to the binarization performed in transform skip residual coding, also referred to as transform skip mode. More specifically, this disclosure describes techniques related to an entropy decoding process that converts a binary representation to a series of non-binary valued quantized coefficients. The corresponding entropy encoding process, which is the reverse process of entropy decoding, is also described herein.

B. Bross, T. Nguyen, P. Keydel, H. Schwarz, D. Marpe, T. Wiegand, "Non-CE8: Unified Transform Type Signalling and Residual Coding for Transform Skip," JVET document JVET-M0464, Marrackech, Mass., January 2019 (hereinafter JVET-M0464) describes techniques related to transform skip residual coding.

If implementing the transform skip residual coding described in JVET-M0464, video decoder 300 decodes a coefficient level (CoeffLevel) using the syntax elements sig_coeff_flag and abs_level_gtX_flags, where X=1, 2, . . . 5, par_level_flag, abs_remainder, and coeff_sign_flag. The syntax element sig_coeff_flag indicates if the coefficient is nonzero. The syntax element coeff_sign_flag indicates if the coefficient is negative, and the syntax element par_level_flag indicates if the coefficient is odd or even. The syntax element abs_level_gtX_flags (X=1, 2, . . . 5) indicates if the absolute coefficient level is larger than 1<<(X−1), where << represents a left shift operation. Specifically, if the coefficient is nonzero (i.e., sig_coeff_flag=0), then video decoder 300 receives and parses a flag abs_level_gt1_flags, with the flag indicating if the absolute coefficient value is larger than 1. If the absolute coefficient value is larger than 1, then video decoder 300 receives a syntax abs_level_gt2_flags indicating if the absolute coefficient value is larger than 2. Similarly, if the absolute coefficient value is larger than 1<<(a−1), then video decoder 300 receives a syntax element abs_level_gtX_flags, with a+1, indicating if the absolute coefficient value is larger than 1<<a. If the absolute coefficient level is larger than 10, then video decoder 300 receives and parses a syntax element abs_remainder indicating the difference, e.g., abs(CoeffLevel)−10.

Video decoder 300 may then derive the reconstructed transform coefficient for a nonzero coefficient as follows:

CoeffLevel=(1−2*coeff_sign_flag)*(1+
abs_level_$gt$1_flag+$par$_level_flag+2*
(abs_level_$gt$2flag+abs_level_
$gt$3flag+ . . . +abs_level_$gt$5flag)+2*abs_remainder).

The binarization techniques in WET-M0464, however, fail to reflect the dynamic range of the absolute coefficient levels for different quantization parameters. For a low QP range, an absolute quantized transform skip coefficient may have a large value, such as a value of greater than 20. In such case, all the abs_level_gtX_flags, which are coded with regular bins, have to be signalled by video encoder 200, while a large remaining value (CoeffLevel)−10 also has to be signalled with bypass bins. Bypass coding generally refers to entropy coding that is not context adaptive.

According to the techniques of this disclosure, a new binarization process is proposed for transform skip residual coding. For an input quantization parameter of QP, video encoder 200 and video decoder 300 can be configured to derive the corresponding dynamic range [0, maxTsLevel] of transform skip coefficients as follows:

const int iQBits=QUANT_SHIFT+qpPer;
int   maxTsLevel=((quantisationCoefficient*((1<<channelBitDepth)−1)+(1<<(iQBits−1)))>>iQBits);
where QUANT_SHIFT is the quantization shift parameter (currently set to be 14 in VTM5.0), qpPer is equal to QP/6, and quantisationCoefficient is the quantizationScaler currently derived based on a look-up table quantisationLookUp in VTM5.0:
quantisationLookUp=[26214,23302,20560,18396,16384, 14564].

The quantizationScaler quantisationCoefficient is equal to quantisationLookUp[qpRem], where qpRem is the remainder of QP divided by 6. The value in quantisation LookUp[ ] is derived by $$2^{14+4-QP\%6/6}$$

For purposes of explanation, the original residual can be represented as R, and the quantized residual can be represented as Rq. The formula used for quantization is $$Rq=R/qStep$$

where qStep is a function of QP: $qStep=2^{QP-4/6}$.

A large value for QP corresponds to a larger value for qStep, and hence smaller Rq, meaning coarser quantization.

The following pseudocode illustrates an example implementation of the above formula in software, using an integer implementation:

Rq=(quantisationLookUp [QP %6] *R+ (1<<(iQBits−1)))>>iQbits

QP %6 denotes the remainder of QP dived by 6.

The value in quantisationLookUp[ ] can be derived by:

$$2^{14+4-QP\%6/6}$$

iQBits=14+qpPer, where qpPer is the quotient of QP/6

For a given a QP value, the maximum quantized magnitude maxTsLevel occurs for the largest residual value, which is (1<<channelBitDepth)−1.

In one example, after video encoder 200 and video decoder 300 calculate the dynamic range of quantized coefficients, video encoder 200 and video decoder 300 can divide the range into k intervals:

$$[2,t_1],[t_1+1,t_2],[t_2+1,t_3],\ldots[t_{k-2}+1,t_{k-1}],[t_{k-1}+1,\text{maxTsLevel}].$$

After signaling the syntax element sig_coeff_flag, coeff_sign_flag, and abs_level_gt1_flag as in the current transform skip residual coefficient described in JVET-M0464, video encoder 200 may signal syntax elements abs_level_gtTX_flag indicating the level of the absolute coefficients. Specifically, if the absolute coefficient level is greater than 1, then video encoder 200 signals a syntax element abs_level_gtT1_flag indicating if the absolute level is larger than $t_1$. Similarly, for other level syntax, if the absolute coefficient level is larger than $t_{X-1}$, then video encoder 200 signals a syntax element abs_level_gtTX_flag indicating if the absolute coefficient level is larger than $t_X$. The syntax element abs_level_gtTX_flag can be coded in a bitplane fashion, where syntax abs_level_gtTX_flag for all the coefficient in the current block would be coded before coding the syntax element abs_level_gtT(X+1)_flag, or in a interleaving fashion, where all the abs_level_gtTX_flag elements for one coefficient are coded before coding the next coefficient. Similar to abs_level_gtX_flag coding in the current transform skip residual coding in VTM5.0, the syntax elements abs_level_gtTX_flag can be coded with regular bins if the number of regular coded bin limit (currently set as 2*block width*block height) is not reached. If the limit is reached, the rest of the syntax element are bypass coded.

After encoding sig_coeff_flag, coeff_sign_flag, abs_level_gt1_flag and abs_level_gtTX_flag, in the last pass, video encoder 200 may signal syntax element abs_remainder, indicating the remainder within the interval where the absolute coefficient level falls into, in bypass mode, e.g. using truncated unary coding or Rice codes. For example, if the absolute coefficient level absCoeffLevel falls into the interval $[t_{c-1}+1, t_c]$, syntax abs_level_gtT1_flag, abs_level_gtT1_flag, abs_level_gtTc_flag would be signaled. In the last pass, the remainder absCoeffLevel−($t_{c-1}$+1) can then be signaled in bypass mode.

Video decoder 300 may receive the syntax elements described above and derive the reconstructed transform coefficient for a nonzero coefficient as follows:

CoeffLevel=(1−2*coeff_sign_flag)*(1+
abs_level_gt1_flag+abs_level_gtT1_flag*($t_1$−1)+
abs_level_gtT2_flag*($t_2$−$t_1$)+
abs_level_gtT3_flag*($t_3$−$t_2$) . . . +abs_level_gt
(k−1)_flag*($t_{k-1}$−$t_{k-2}$)+abs_remainder).

As the proposed binarization process for transform skip residual coding can better model a large dynamic range of coefficient levels, the techniques of this disclosure can also be used in conjunction with quantization parameter offsets (qp_offset), where the QP set for a current coding unit is modified as QP−qp_offset, if the proposed binarization for transform skip residual coding is applied. qp_offset is a positive integer.

The binarization techniques described herein for transform skip residual coding may also be applied to coefficients coded after Quantized residual DPCM (RDPCM) is applied. However, due to the residual subtraction, the maximum coefficient magnitude is 2*maxTsLevel rather than maxTsLevel. The maximum magnitude occurs when a coefficient of value maxTsLevel is predicted with a coefficient of value−maxTsLevel, resulting in a coefficient residual of value 2*maxTsLevel. Video encoder 200 and video decoder 300 may therefore configured to calculate the dynamic range as [0, 2*maxTsLevel] for blocks coded in RDPCM.

According to one example technique of this disclosure, video encoder 200 and video decoder 300 may be configured to calculate the dynamic range of coefficients and divide the range into k (inclusive) intervals as follows:

For coefficient in transform skip mode:

$$[2,t_1],[t_1+1,t_2],[t_2+1,t_3],\ldots[t_{k-2}+1,t_{k-1}],[t_{k-1}+1,\text{maxTsLevel}].$$

For coefficient in RDPCM mode:

$$[2,t_1],[t_1+1,t_2],[t_2+1,t_3],\ldots[t_{k-2}+1,t_{k-1}],[t_{k-1}+1,2*\text{maxTsLevel}].$$

After signaling the syntax element sig_coeff_flag, coeff_sign_flag and abs_level_gt1_flag as in the current transform skip residual coefficient, as described in JVET-M0464, video encoder 200 may signal the index of the interval where the coefficient falls into and the remainder within the interval. Below are several examples in signaling the interval indices.

In a first example, if the absolute coefficient level is greater than 1, i.e., abs_level_gt1_flag=1, then video encoder 200 signals a syntax element abs_level_gtT1_flag indicating if the absolute level is larger than $t_1$. Similarly for other level syntax, if the absolute coefficient level is larger than $t_{X-1}$, video encoder 200 signals a syntax element abs_level_gtTX_flag indicating if the absolute coefficient level is larger than $t_X$. The syntax element abs_level_gtTX_flag can be coded in a bitplane fashion, where syntax abs_level_gtTX_flag for all the coefficient in the current block would be coded before coding the syntax element abs_level_gtT(X+1)_flag, or in a interleaving fashion, where all the abs_level_gtTX_flag elements for one coefficient are coded before coding the next coefficient. Similar to abs_level_gtX_flag coding in the current transform skip residual coding in VTM, the syntax elements abs_level_gtTX_flag can be coded with regular bins if the number of regular coded bin limit (currently set as 2*block width*block height) is not reached. If the limit is reached, the rest of the syntax element are bypass coded.

In another example, if the absolute coefficient level is greater than 1, i.e., abs_level_gt1_flag=1, then video encoder 200 signals a value k if the coefficient falls into the interval [$t_{k-1}$+1, $t_k$]. Video encoder 200 may, for example, encode the value in bypass mode, such as using Rice-Golomb coding or truncated binary coding. In some examples, video encoder 200 may encode the value with context coded bins after binarization, for example using unary coding, where each bin in the unary code is coded as a context coded bin. If a regular coded bin limit is reached, such as a limit set at 2*block width*block height, then video encoder 200 may bypass code the rest of the bins.

After signaling the interval indices, video encoder 200 may signal the syntax element abs_remainder, indicating the remainder within the interval where the absolute coefficient level falls. For example, if the absolute coefficient level absCoeffLevel falls into the interval [$t_{c-1}$+1, $t_c$], then video encoder 200 signals a remainder absCoeffLevel−($t_{c-1}$+1). Video encoder 200 may signal the remainder in bypass mode, for example, using truncated unary coding or Rice codes. Video decoder 300 may receive the syntax elements described herein and determine a value for absCoeffLevel based on the received syntax elements in the manner described above.

According to another example of this disclosure, video encoder 200 and video decoder 300 may be configured to determine the dynamic range of coefficient values and divide the range into k (inclusive) intervals as follows:

For coefficient in transform skip mode:

$$[1,t_1],[t_1+1,t_2],[t_2+1,t_3], \ldots [t_{k-2}+1,t_{k-1}],[t_{k-1}+1, \text{maxTsLevel}].$$

For coefficient in RDPCM mode:

$$[1,t_1],[t_1+1,t_2],[t_2+1,t_3], \ldots [t_{k-2}+1,t_{k-1}],[t_{k-1}+1, 2*\text{maxTsLevel}].$$

Video encoder 200, after signaling the syntax element sig_coeff_flag and coeff_sign_flag, as in the current transform skip residual coding described in JVET-M0464, may signal the index of the interval where the coefficient falls and the remainder within the interval as described above.

Figure 3:
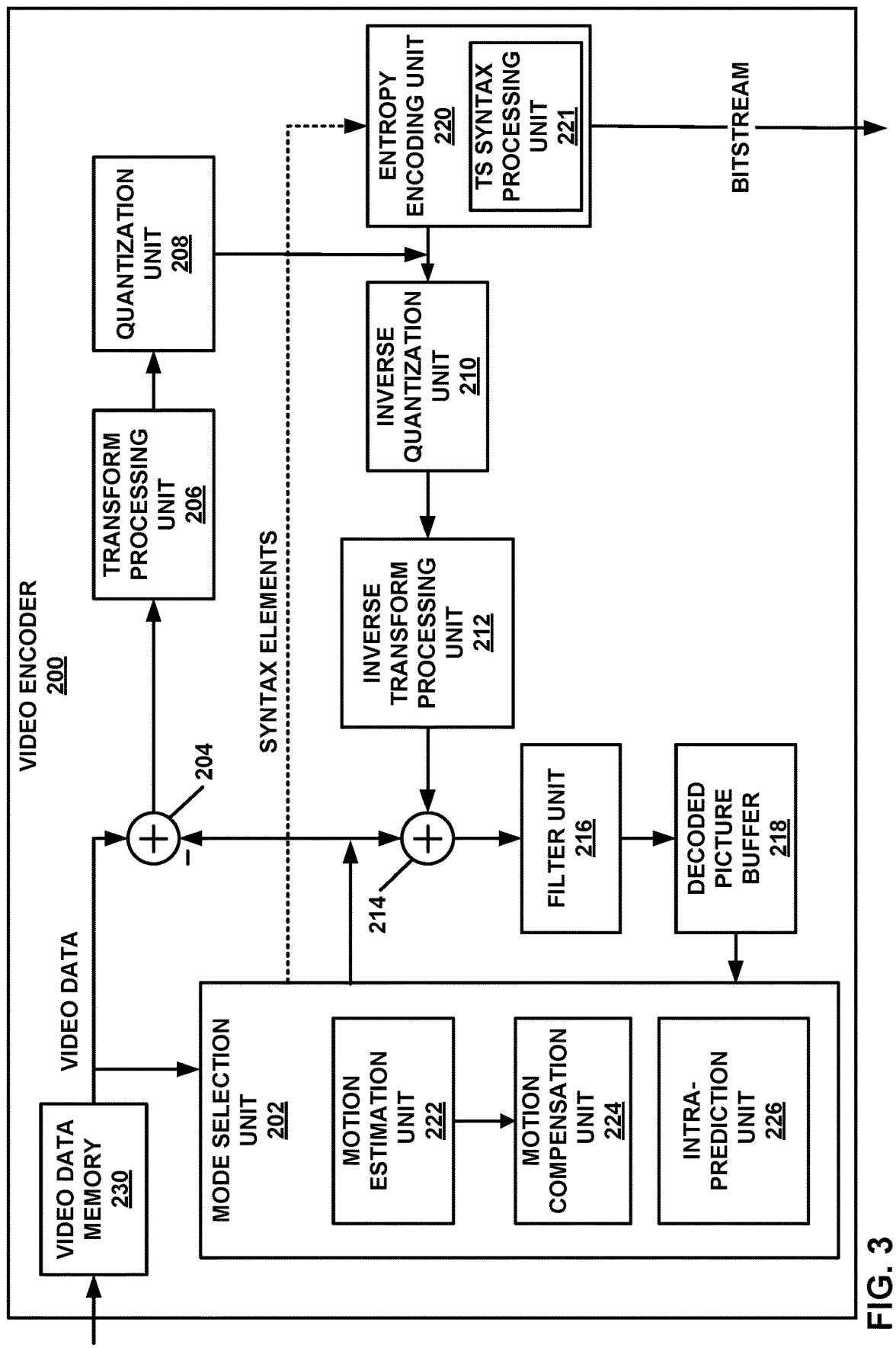
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Entropy encoding unit 220 includes transform skip syntax processing unit 221. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. For a block of video data coded in a transform skip mode, transform processing unit 206 may be viewed as a pass-through unit that does not alter the residual block.

Quantization unit 208 may quantize the coefficients in a coefficient block, to produce a quantized coefficient block. Quantization unit 208 may quantize coefficients of a coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized coefficients may have lower precision than the original coefficients output by transform processing unit 206.

Inverse quantization unit 210 and inverse transform processing unit 212 may apply inverse quantization and inverse transforms to a quantized coefficient block, respectively, to reconstruct a residual block from the coefficient block. For a block of video data coded in a transform skip mode, inverse transform processing unit 212 may be viewed as a pass-through unit that does not alter the dequantized coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are performed, reconstruction unit 214 may store reconstructed blocks to DPB 218. In examples where operations of filter unit 216 are not performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

According to the techniques of this disclosure, transform skip syntax processing unit 221 of entropy encoding unit 220 may be configured to signal the level for a quantized residual value of a block by determining a range for levels of quantized residual values of the block of video data based on a quantization parameter and dividing the range into k intervals. Transform skip syntax processing unit 221 can then signal the level for the quantized residual value of the block based on the k intervals by generating, for inclusion in the bitstream of encoded video data, one or more syntax elements indicating a particular interval that includes the level for the quantized residual value and generating, for inclusion in the bitstream of encoded video data, a syntax element indicating a difference value that represents a difference between a reference level value for the particular interval and the level for the quantized residual value of the block.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 also represents an example of a device configured to encode video data including a memory configured to store video data, and one or more processing units implemented in circuitry and configured to determine that a block of video data is encoded in a transform skip mode;

determine a quantization parameter for the block of video data; based on the determined quantization parameter, determine a range for residual values of the block of video data; divide the range into k intervals, where k is an integer value; and determining values for one or more syntax elements based on the k intervals. The syntax elements include, for example, the abs_level_gtTX_flag and abs_remainder syntax elements described above.

Figure 4:
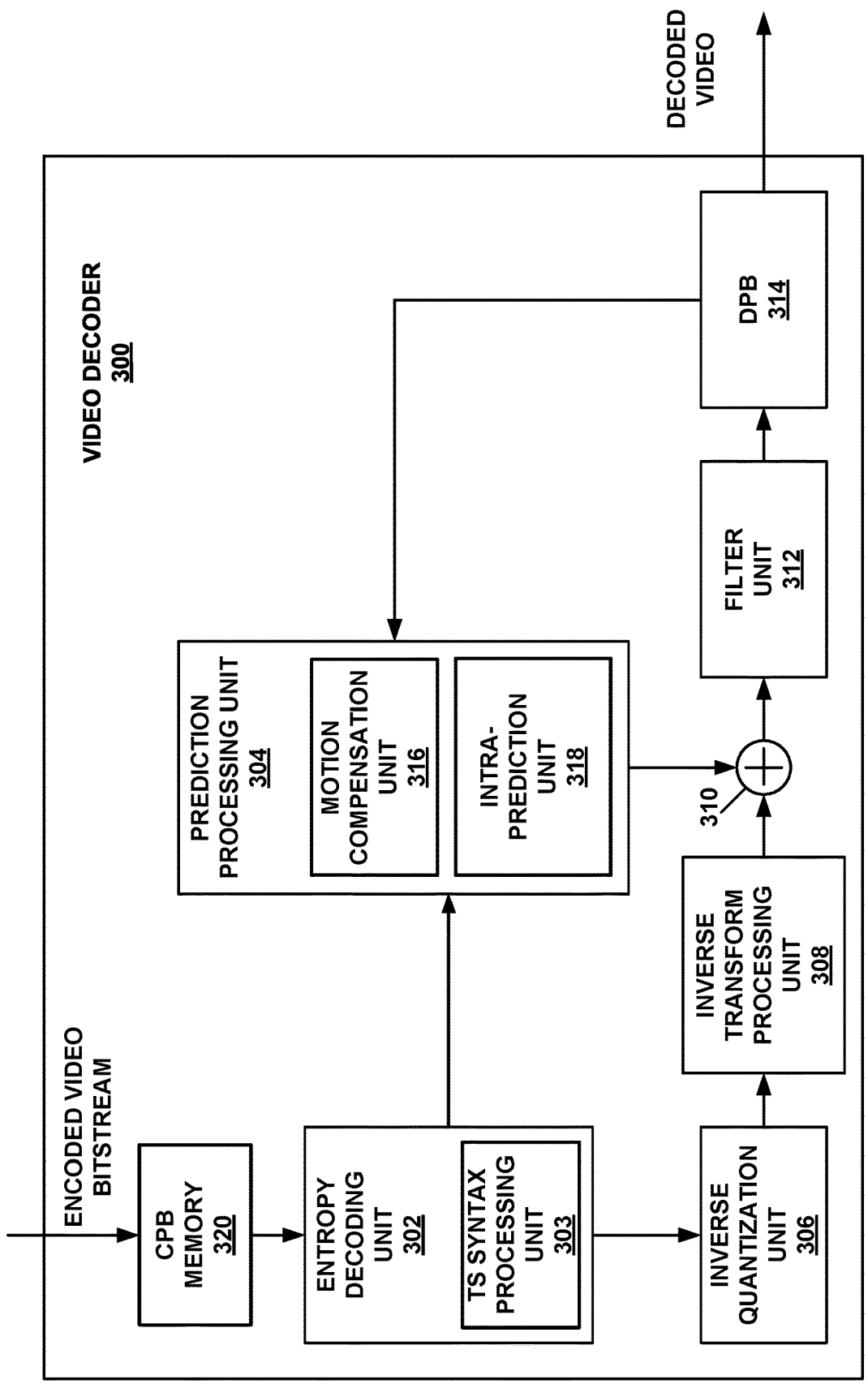
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Entropy decoding unit 302 includes transform skip syntax processing unit 303. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized coefficients of a quantized coefficient block, as well as transform information, such as a quantization parameter (QP) and/or transform mode indication(s). Inverse quantization unit 306 may use the QP associated with the quantized coefficient block to determine a degree of quantization and, likewise, a degree of inverse quantization for inverse quantization unit 306 to apply. Inverse quantization unit 306 may, for example, perform a bitwise left-shift operation to inverse quantize the quantized coefficients. Inverse quantization unit 306 may thereby form a coefficient block including coefficients.

According to the techniques of this disclosure, for a block of video data that is encoded in a transform skip mode, transform skip syntax processing unit 303 of entropy decoding unit 302 may be configured to determine a range for levels of quantized residual values of the block of video data based on the determined quantization parameter and divide the range into k intervals. Transform skip syntax processing unit 303 may then determine a level for a quantized residual value of the block based on the k intervals by receiving information indicating the level for the quantized residual value is within a particular interval of the k intervals, receive information indicating a difference value representing a difference between a reference level value for the particular interval and the level for the quantized residual value of the block, and determining the level for the quantized residual value based on the reference level value and the difference value.

After inverse quantization unit 306 forms the coefficient block, inverse transform processing unit 308 may apply one or more inverse transforms to the coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block. For blocks coded in a transform skip mode, inverse transform processing unit 308 may be viewed as a pass-through unit that does not alter the dequantized coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that a block of video data is encoded in a transform skip mode; determine a quantization parameter for the block of video data; based on the determined quantization parameter, determine a range for residual values of the block of video data; divide the range into k intervals, where k is an integer value; and determine a value for a coefficient of residual data based on the k intervals. Video decoder 300 may, for example, interpret the value of one or more syntax elements based on the determined intervals.

In some implementations, video decoder 300 may also receive a syntax element indicating the coefficient has a value greater than zero, a syntax element indicating the coefficient has a value greater than one, and/or a syntax element indicating a sign for the coefficient.

Video decoder 300 may, for a first interval of the k intervals, receive a syntax element indicating that a value for the coefficient is greater than values included in the first interval, for a second interval of the k intervals, receive a syntax element indicating that the value for the coefficient is included in the second interval, and receive a syntax element indicating a difference between an initial value for the second interval and the value for the coefficient. The syntax element indicating the difference may be bypass coded.

Video decoder 300 may receive, for respective intervals, flags indicating that a value for the coefficient is greater than values included in the respective intervals for the flags until receiving a flag indicating the value for the coefficient is within an interval for the flag. Video decoder 300 may then receive a syntax element indicating a difference between an initial value for the interval for the flag and the value for the coefficient. The syntax element indicating the difference may, for example, be bypass coded.

The k intervals may, for example, include an interval ranging from 0 to 0, an interval ranging from 1 to 1, an interval ranging from 2 to a first threshold, an interval ranging from the first threshold plus 1 to a second threshold, and an interval ranging from the second threshold plus 1 to a third threshold. Video decoder 300 may determine the first threshold, the second threshold, and the third threshold based on the quantization parameter as described above. The k intervals may also include an interval ranging from the third threshold plus 1 to a maximum value for the range.

Video decoder 300 may be configured to receive a syntax element indicating an index for one of the k intervals, wherein the one of the k intervals indicated by the index corresponds to an interval of the k intervals that includes the value for the coefficient. Video decoder 300 may then receive a syntax element indicating a difference value between a starting value of the one of the k intervals and the value for the coefficient.

Figure 5:
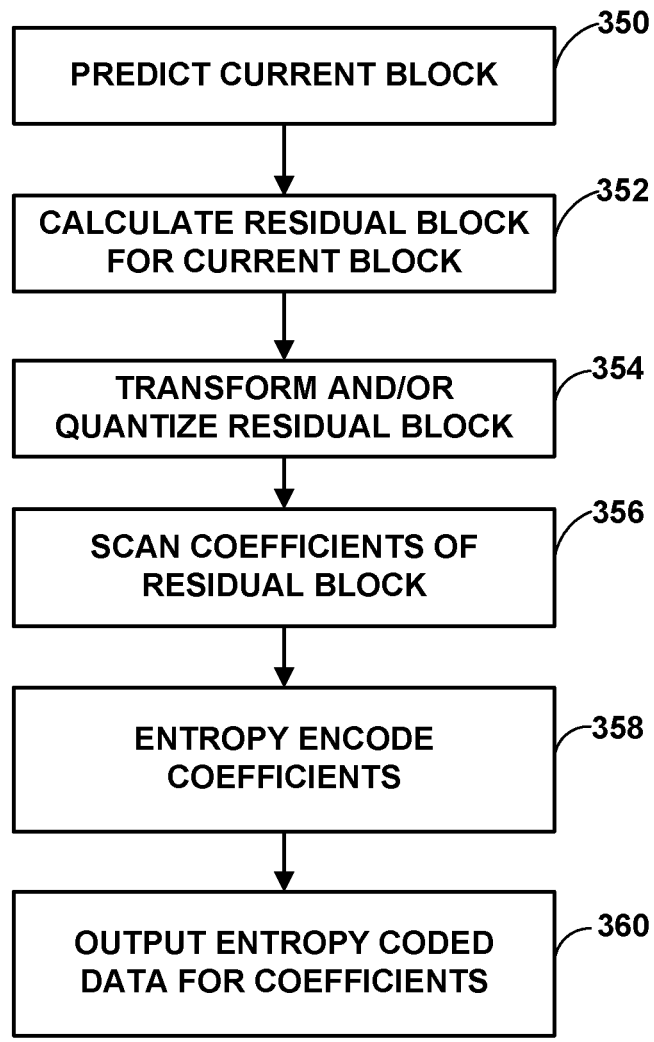
FIG. 5 is a flowchart illustrating an example video encoding process.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). For blocks coded in a transform skip mode, the residual block may only be quantized, and not transformed, at step 354. Next, video encoder 200 may scan the quantized coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 6:
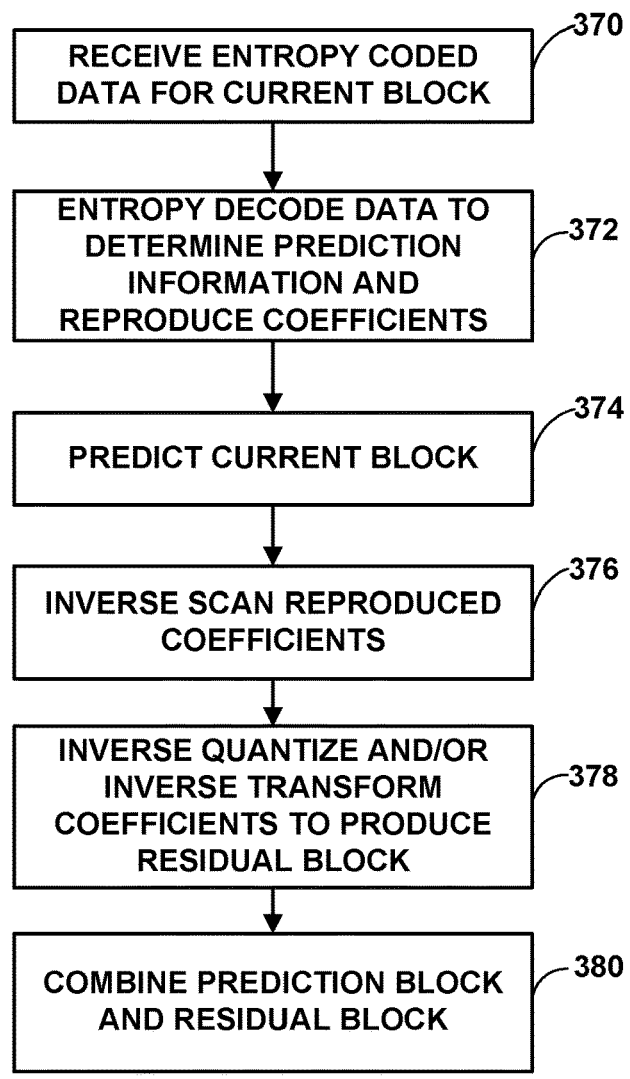
FIG. 6 is a flowchart illustrating an example video decoding process.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized coefficients. Video decoder 300 may then inverse quantize and inverse transform the coefficients to produce a residual block (378). For blocks coded in a transform skip mode, video decoder 300 may only inverse quantize, and not inverse transform, the block of quantized coefficients at step 378. Video decoder 300 may ultimately decode the current block by combining the prediction block and the residual block (380).

Figure 7:
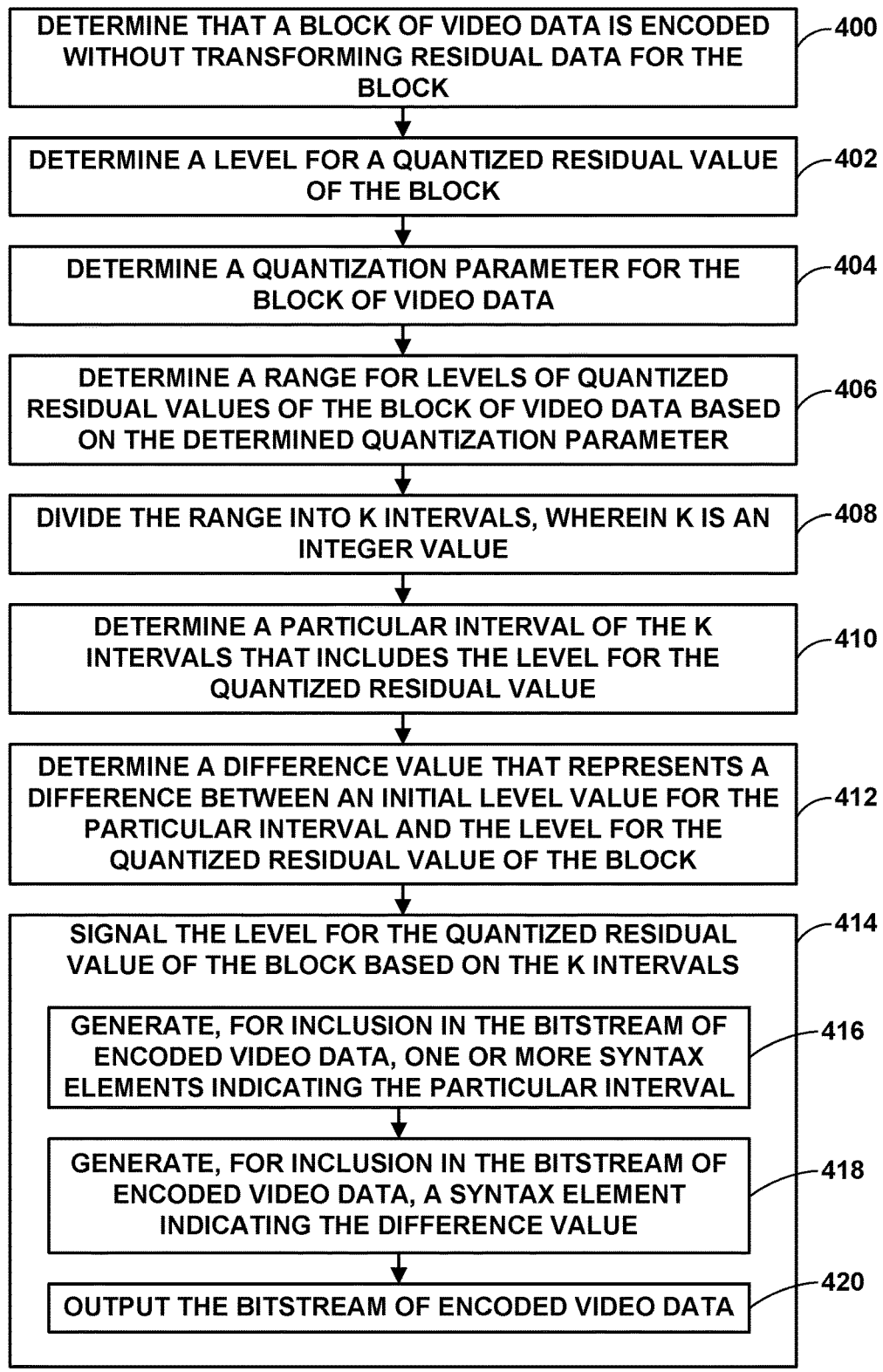
FIG. 7 is a flowchart illustrating an example video encoding process.

FIG. 7 is a flowchart illustrating an example method for encoding a current block. The current block may comprise a current CU. Although described with respect to video encoder 200 (FIGS. 1 and 3), it should be understood that other devices may be configured to perform a method similar to that of FIG. 7.

Video encoder 200 determines that a block of video data is encoded without transforming residual data for the block (400). The block may, for example, be encoded in a transform skip mode. Video encoder 200 determines a level for a quantized residual value of the block (402). To determine the level for the quantized residual value of the block, video encoder 200 may, for example, be configured to determine a level for a residual value and quantize the level for the residual value to determine the level for the quantized residual value.

Video encoder 200 determines a quantization parameter for the block of video data (404). Video encoder 200 determines a range for levels of quantized residual values of the block of video data based on the determined quantization parameter (406).

Video encoder 200 divides the range into k intervals with k representing an integer value (408). The k intervals may, for example, include the following intervals:

$$[X, t_1], [t_1+1, t_2], [t_2+1, t_3], \ldots [t_{k-2}+1, t_{k-1}], [t_{k-1}+1, \text{maxTsLevel}], \text{ with}$$

maxTsLevel representing a maximum possible level for the levels of quantized residual values of the block based on the quantization parameter for the block, $t_n$ representing an upper threshold for the n-th interval, wherein n ranges from 0 to k−1, and X representing a minimum value for a first interval, e.g., a 0th interval. As explained elsewhere, X may equal 0, 1, 2, or some other value.

Video encoder 200 determines a particular interval of the k intervals that includes the level for the quantized residual value (410). Video encoder 200 determines a difference value that represents a difference between a reference level value for the particular interval and the level for the quantized residual value of the block (412).

Video encoder 200 signals the level for the quantized residual value of the block based on the k intervals (414). As part of signaling the level for the quantized residual value of the block based on the k intervals, video encoder 200 generates, for inclusion in the bitstream of encoded video data, one or more syntax elements indicating the particular interval (416) and generates for inclusion in the bitstream of encoded video data, a syntax element indicating the difference value (418). Video encoder 200 may, for example, bypass encode the syntax element indicating the difference value.

Video encoder 200 may, for example, generate, for inclusion in the bitstream of encoded video data, for respective intervals of the k intervals, flags indicating that the level for the quantized residual value is greater than values included in the respective intervals for the flags until generating, for inclusion in the bitstream of encoded video data, a flag indicating the level for the quantized residual value is within an interval associated with the flag. Video encoder 200 may additionally generate, for inclusion in the bitstream of encoded video data, a syntax element indicating a sign for the residual value.

Video encoder 200 may, for example, for a first interval of the k intervals, generate, for inclusion in the bitstream of encoded video data, a syntax element, such as a 1-bit flag, indicating that the level for the quantized residual value is greater than values included in the first interval; for a second interval of the k intervals, generate, for inclusion in the bitstream of encoded video data, a syntax element, such as another 1-bit flag. indicating that the level for the quantized residual value is included in the second interval. For the syntax element indicating the difference value, video encoder 200 may generate a syntax element set to a difference between a reference level value for the second interval and the level for the quantized residual value of the block.

In some examples, a first interval of the k intervals may include values ranging from 1 to a first threshold, and video encoder 200 may be configured to generate, for inclusion in the bitstream of encoded video data, a syntax element indicating that the level of the quantized residual value is greater than zero. In instances when the level for the quantized residual value is equal to zero, then video encoder 200 does not need to signal any additional information indicating the quantized residual value. That is, video encoder does not need to generate, for inclusion in the bitstream of encoded video data, one or more syntax elements indicating the particular interval or a syntax element indicating the difference value.

In some examples, a first interval of the k intervals may include values ranging from 2 to a first threshold, and video encoder 200 may generate, for inclusion in the bitstream of encoded video data, a syntax element indicating that the level for the quantized residual value is greater than zero and a syntax element indicating that the level for the quantized residual value is greater than one. In instances when the level for the quantized residual value is equal to one, then video encoder 200 does not need to signal any additional information indicating the quantized residual value. That is, video encoder does not need to generate, for inclusion in the bitstream of encoded video data, one or more syntax elements indicating the particular interval or a syntax element indicating the difference value.

As part of signaling the level for the quantized residual value of the block based on the k intervals, video encoder 200 also outputs the bitstream of encoded video data (420).

Video encoder 200 may, for example, output the bitstream of encoded video by storing the bitstream in a memory device or by transmitting the bitstream of encoded video data to another device.

Figure 8:
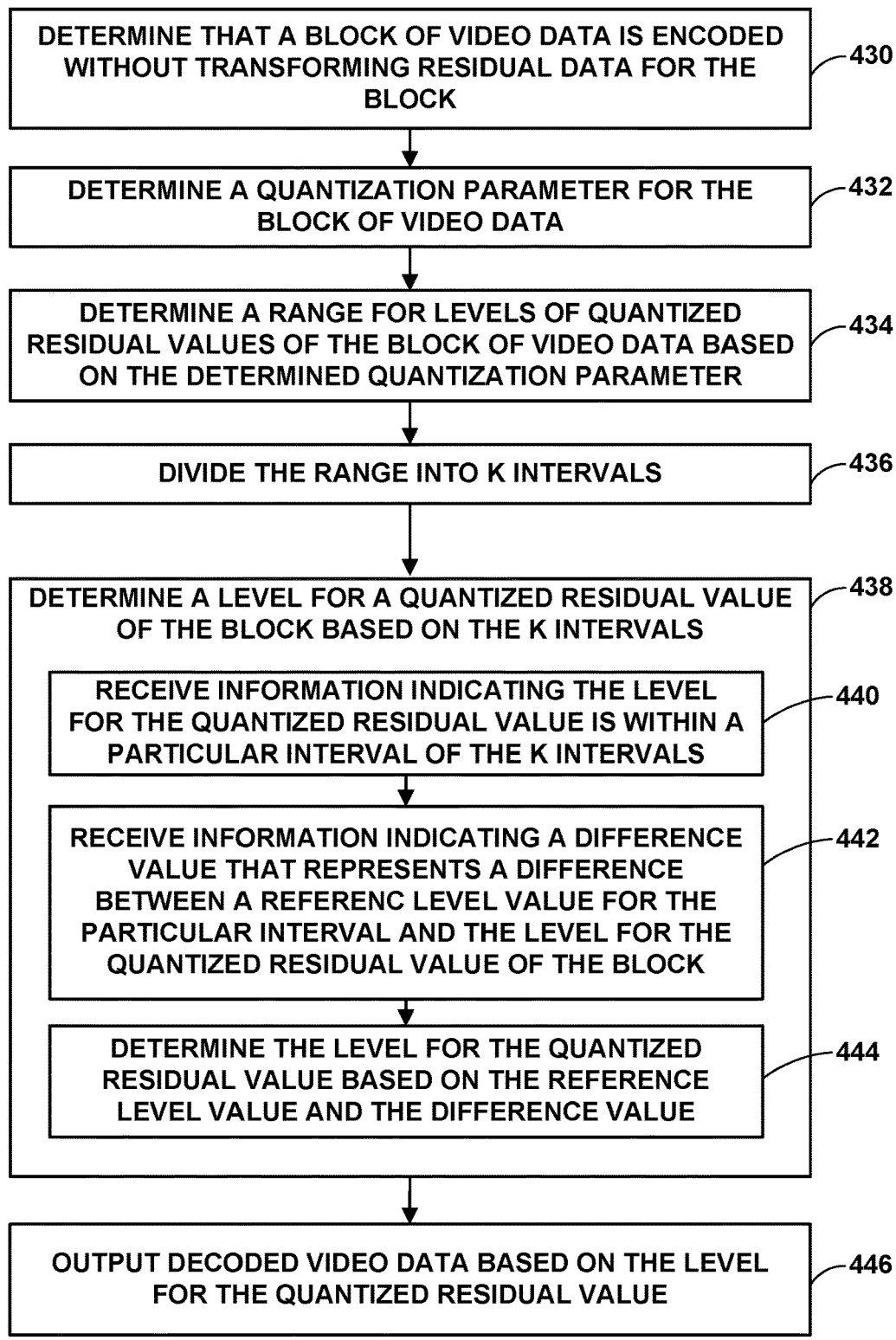
FIG. 8 is a flowchart illustrating an example video decoding process.

FIG. 8 is a flowchart illustrating an example method for decoding a current block. The current block may comprise a current CU. Although described with respect to video decoder 300 (FIGS. 1 and 4), it should be understood that other devices may be configured to perform a method similar to that of FIG. 5.

Video decoder 300 determines that a block of video data is encoded without transforming residual data for the block (430). The block may, for example, be encoded in a transform skip mode. Video decoder 300 determines a quantization parameter for the block of video data (432). Video decoder 300 may, for example, received an indication of the quantization parameter in the video data.

Video decoder 300 determines a range for levels of quantized residual values of the block of video data based on the determined quantization parameter (434). The range for the levels of quantized residual values is typically smaller than the bit depth of the video data. For example, if 8-bit video data has sample values that range from 0 to $2^8-1$, then quantized residual values have a range from 0 to a maximum value that is smaller than $2^8-1$. That maximum value is a function of the particular quantization parameter used for the video data. Video decoder 300 divides the range into k intervals (436).

Video decoder 300 determines a level for a quantized residual value of the block based on the k intervals (438). The k intervals may, for example, include the following intervals:

$$[X, t_1], [t_1+1, t_2], [t_2+1, \ldots t_3], [t_{k-2}+1, t_{k-1}], [t_{k-1}+1, \text{maxTsLevel}], \text{ with}$$

maxTsLevel representing a maximum possible level for the levels of quantized residual values of the block based on the quantization parameter for the block, $t_n$ representing an upper threshold for the n-th interval, wherein n ranges from 0 to k−1, and X representing a minimum value for a first interval, e.g., a 0th interval. As explained elsewhere, X may equal 0, 1, 2, or some other value.

In examples where X equals 0, the k intervals include an interval ranging from 0 to a first threshold, an interval ranging from the first threshold plus 1 to a second threshold, an interval ranging from the second threshold plus 1 to a third threshold, and other intervals. In examples where X equals 1, the k intervals include an interval ranging from 1 to a first threshold, an interval ranging from the first threshold plus 1 to a second threshold, an interval ranging from the second threshold plus 1 to a third threshold, and other intervals. In examples where X equals 2, the k intervals include an interval ranging from 2 to a first threshold, an interval ranging from the first threshold plus 1 to a second threshold, an interval ranging from the second threshold plus 1 to a third threshold, and other intervals. The k intervals also include an interval that includes the maximum value for the range.

As part of determining a level for a quantized residual value of the block based on the k intervals, video decoder 300 receives information indicating the level for the quantized residual value is within a particular interval of the k intervals (440) and receives information indicating a difference value that represents a difference between a reference level value for the particular interval and the level for the quantized residual value of the block (442). Video decoder 300 may, for example, bypass decode the syntax element indicating the difference value. Video decoder 300 then determines the level for the quantized residual value based on the reference level value and the difference value (444).

Video decoder 300 may, for example, receive, for respective intervals of the k intervals, flags indicating that the level for the quantized residual value is greater than values included in the respective intervals for the flags until receiving a flag indicating the level for the quantized residual value is within an interval associated with the flag.

In examples where X equals 1, video decoder 300 may receive a syntax element indicating that the level for the quantized residual value is greater than zero before receiving the information indicating the level for the quantized residual value is within the particular interval of the k intervals or the information indicating the difference value. In instances when the level for the quantized residual value is equal to zero, then video decoder 300 does not need to receive any additional information indicating the quantized residual value. That is, video decoder 300 does not need to receive information indicating the level for the quantized residual value is within a particular interval of the k intervals or receive information indicating a difference value.

In examples, where X equals 2, video decoder 300 may receive a syntax element indicating that the level for the quantized residual value is greater than zero and receive a syntax element indicating that the level for the quantized residual value is greater than one before receiving the information indicating the level for the quantized residual value is within the particular interval of the k intervals or the information indicating the difference value. In instances when the level for the quantized residual value is equal to one, then video decoder 300 does not need to receive any additional information indicating the quantized residual value. That is, video decoder 300 does not need to receive information indicating the level for the quantized residual value is within a particular interval of the k intervals or receive information indicating a difference value.

Video decoder 300 outputs decoded video data based on the level for the quantized residual value (446). Video decoder 300 may, for example, output the decoded video data for display or output the decoded video data for storage. As part of decoding the video data, video decoder 300 may, for example, dequantize the level for the quantized residual value to determine a level for a dequantized residual value, receive a syntax element indicating a sign for the dequantized residual value, and determine the dequantized residual value based on the level for the dequantized residual value and the sign for the dequantized residual value. Video decoder 300 may also determine a residual block for the block of video data, add the residual block to a prediction block for the block of video data to determine a reconstructed block for the block of video data, and generate a picture of decoded video data based on the reconstructed block. Video decoder 300 may additionally perform one or more filtering operations on the reconstructed block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a block of video data is encoded without transforming residual data for the block;
   determining a quantization parameter for the block of video data;
   based on the determined quantization parameter, determining a range for levels of quantized residual values of the block of video data, wherein the range goes from zero to a maximum possible level for the levels of quantized residual values of the block of video data;
   dividing the range into k intervals, wherein k is an integer value, each interval includes multiple levels for quantized residual values, and each interval has an associated index value between 0 and k−1;
   determining a level for a quantized residual value of the block of video data based on the k intervals, wherein determining the level for the quantized residual value of the block of video data based on the k intervals comprises:
      receiving information indicating an index corresponding to a particular interval of the k intervals within which the level for the quantized residual value falls;
      receiving information indicating a difference value, wherein the difference value represents a difference between a reference level value for the particular interval and the level for the quantized residual value of the block of video data; and
      based on the reference level value and the difference value, determining the level for the quantized residual value; and
   outputting decoded video data based on the level for the quantized residual value.

2. The method of claim 1, further comprising:
   dequantizing the level for the quantized residual value to determine a level for a dequantized residual value;
   receiving a syntax element indicating a sign for the dequantized residual value; and
   based on the level for the dequantized residual value and the sign for the dequantized residual value, determining the dequantized residual value.

3. The method of claim 2, further comprising:
   determining a residual block for the block of video data, wherein the residual block comprises the dequantized residual value;
   adding the residual block to a prediction block for the block of video data to determine a reconstructed block for the block of video data;
   generating a picture of decoded video data based on the reconstructed block; and
   outputting the picture of decoded video data.

4. The method of claim 1, wherein a first interval of the k intervals includes values ranging from 1 to a first threshold, the method further comprising:
   receiving a syntax element indicating that the level for the quantized residual value is greater than zero.

5. The method of claim 1, wherein a first interval of the k intervals includes values ranging from 2 to a first threshold, the method further comprising:
   receiving a syntax element indicating that the level for the quantized residual value is greater than zero;

receiving a syntax element indicating that the level for the quantized residual value is greater than one.

6. The method of claim 1, further comprising:
for a first interval of the k intervals, receiving a syntax element indicating that the level for the quantized residual value is greater than values included in the first interval;
for a second interval of the k intervals, receiving a syntax element indicating that the level for the quantized residual value is included in the second interval;
wherein the syntax element indicating the difference value indicates a difference between a reference level value for the second interval and the level for the quantized residual value of the block of video data.

7. The method of claim 1, further comprising:
receiving, for respective intervals of the k intervals, flags indicating that the level for the quantized residual value is greater than values included in the respective intervals for the flags until receiving a flag indicating the level for the quantized residual value is within an interval associated with the flag.

8. The method of claim 1, wherein the k intervals include an interval ranging from 0 to a first threshold, an interval ranging from the first threshold plus 1 to a second threshold, and an interval ranging from the second threshold plus 1 to a third threshold, the method further comprising:
determining the first threshold, the second threshold, and the third threshold based on the quantization parameter.

9. The method of claim 1, wherein the k intervals include an interval ranging from 1 to a first threshold, an interval ranging from the first threshold plus 1 to a second threshold, and an interval ranging from the second threshold plus 1 to a third threshold, the method further comprising:
determining the first threshold, the second threshold, and the third threshold based on the quantization parameter.

10. The method of claim 1, wherein the k intervals include an interval ranging from 2 to a first threshold, an interval ranging from the first threshold plus 1 to a second threshold, and an interval ranging from the second threshold plus 1 to a third threshold, the method further comprising:
determining the first threshold, the second threshold, and the third threshold based on the quantization parameter.

11. The method of claim 10, wherein the k intervals include an interval ranging from the third threshold plus 1 to the maximum possible level for the levels of quantized residual values of the block of video data.

12. The method of claim 1, wherein the k intervals include the following intervals:
$[2, t_1], [t_1+1, t_2], [t_2+1, t_3], \ldots [t_{k-2}+1, t_{k-1}], [t_{k-1}+1, \text{maxTsLevel}]$, wherein maxTsLevel represents the maximum possible level for the levels of quantized residual values of the block of video data based on the quantization parameter for the block of video data, and wherein $t_n$ represents an upper threshold for the n-th interval, wherein n ranges from 0 to k−1.

13. The method of claim 1, further comprising:
bypass decoding the syntax element indicating the difference value.

14. The method of claim 1, wherein the k intervals include the following intervals:
$[X, t_1], [t_1+1, t_2] [t_{k-2}+1, t_{k-1}], [t_{k-1}+1, \text{maxTsLevel}]$, wherein X represents a minimum value for interval k=0, wherein maxTsLevel represents the maximum possible level for the levels of quantized residual values of the block of video data based on the quantization parameter for the block of video data, and wherein $t_n$ represents an upper threshold for the n-th interval, wherein n ranges from 0 to k−1.

15. A method of generating a bitstream of encoded video data, the method comprising:
determining that a block of video data is encoded without transforming residual data for the block;
determining a level for a quantized residual value of the block of video data;
determining a quantization parameter for the block of video data;
based on the determined quantization parameter, determining a range for levels of quantized residual values of the block of video data, wherein the range goes from zero to a maximum possible level for the levels of quantized residual values of the block of video data;
dividing the range into k intervals, wherein k is an integer value, each interval includes multiple levels for quantized residual values, and each interval has an associated index value between 0 and k−1;
determining a particular interval of the k intervals that includes the level for the quantized residual value;
determining a difference value, wherein the difference value represents a difference between a reference level value for the particular interval and the level for the quantized residual value of the block of video data; and
signaling the level for the quantized residual value of the block of video data based on the k intervals, wherein signaling the level for the quantized residual value of the block of video data based on the k intervals comprises:
generating, for inclusion in the bitstream of encoded video data, one or more syntax elements indicating an associated index value of the particular interval;
generating, for inclusion in the bitstream of encoded video data, a syntax element indicating the difference value; and
outputting the bitstream of encoded video data.

16. The method of claim 15, wherein determining the level for the quantized residual value of the block of video data comprises:
determining a level for a residual value; and
quantizing the level for the residual value to determine the level for the quantized residual value.

17. The method of claim 16, further comprising:
generating, for inclusion in the bitstream of encoded video data, a syntax element indicating a sign for the residual value.

18. The method of claim 15, wherein a first interval of the k intervals includes values ranging from 1 to a first threshold, the method further comprising:
generating, for inclusion in the bitstream of encoded video data, a syntax element indicating that the level of the quantized residual value is greater than zero.

19. The method of claim 15, wherein a first interval of the k intervals includes values ranging from 2 to a first threshold, the method further comprising:
generating, for inclusion in the bitstream of encoded video data, a syntax element indicating that the level for the quantized residual value is greater than zero;
generating, for inclusion in the bitstream of encoded video data, a syntax element indicating that the level for the quantized residual value is greater than one.

20. The method of claim 15, further comprising:
for a first interval of the k intervals, generating, for inclusion in the bitstream of encoded video data, a syntax element indicating that the level for the quantized residual value is greater than values included in the first interval;

for a second interval of the k intervals, generating, for inclusion in the bitstream of encoded video data, a syntax element indicating that the level for the quantized residual value is included in the second interval;

wherein the syntax element indicating the difference value indicates a difference between a reference level value for the second interval and the level for the quantized residual value of the block of video data.

21. The method of claim 15, further comprising:
generating, for inclusion in the bitstream of encoded video data, for respective intervals of the k intervals, flags indicating that the level for the quantized residual value is greater than values included in the respective intervals for the flags until generating, for inclusion in the bitstream of encoded video data, a flag indicating the level for the quantized residual value is within an interval associated with the flag.

22. The method of claim 15, wherein the k intervals include an interval ranging from 0 to a first threshold, an interval ranging from the first threshold plus 1 to a second threshold, and an interval ranging from the second threshold plus 1 to a third threshold, the method further comprising:
determining the first threshold, the second threshold, and the third threshold based on the quantization parameter.

23. The method of claim 15, wherein the k intervals include an interval ranging from 1 to a first threshold, an interval ranging from the first threshold plus 1 to a second threshold, and an interval ranging from the second threshold plus 1 to a third threshold, the method further comprising:
determining the first threshold, the second threshold, and the third threshold based on the quantization parameter.

24. The method of claim 15, wherein the k intervals include an interval ranging from 2 to a first threshold, an interval ranging from the first threshold plus 1 to a second threshold, and an interval ranging from the second threshold plus 1 to a third threshold, the method further comprising:
determining the first threshold, the second threshold, and the third threshold based on the quantization parameter.

25. The method of claim 24, wherein the k intervals include an interval ranging from the third threshold plus 1 to the maximum possible level for the levels of quantized residual values of the block of video data.

26. The method of claim 15, wherein the k intervals include the following intervals:
$[2, t_1], [t_1+1, t_2], [t_2+1, t_3], [t_{k-2}+1, t_{k-1}], [t_{k-1}+1, \text{maxTsLevel}]$, wherein maxTsLevel represents the maximum possible level for the levels of quantized residual values of the block of video data based on the quantization parameter for the block of video data, and wherein $t_n$ represents an upper threshold for the n-th interval, wherein n ranges from 0 to k−1.

27. The method of claim 15, further comprising:
bypass encoding the syntax element indicating the difference value.

28. A device for decoding video data, the device comprising:
a memory configured to store video data; and
one or more processors configured to:
determine that a block of video data is encoded without transforming residual data for the block;
determine a quantization parameter for the block of video data;
based on the determined quantization parameter, determine a range for levels of quantized residual values of the block of video data, wherein the range goes from zero to a maximum possible level for the levels of quantized residual values of the block of video data;
divide the range into k intervals, wherein k is an integer value, each interval includes multiple levels for quantized residual values, and each interval has an associated index value between 0 and k−1;
determine a level for a quantized residual value of the block of video data based on the k intervals, wherein to determine the level for the quantized residual value of the block of video data based on the k intervals, the one or more processors are further configured to:
receive information indicating an index corresponding to a particular interval of the k intervals within which the level for the quantized residual value falls;
receive information indicating a difference value, wherein the difference value represents a difference between a reference level value for the particular interval and the level for the quantized residual value of the block of video data; and
based on the reference level value and the difference value, determine the level for the quantized residual value; and
output decoded video data based on the level for the quantized residual value.

29. The device of claim 28, wherein the one or more processors are further configured to:
dequantize the level for the quantized residual value to determine a level for a dequantized residual value;
receive a syntax element indicating a sign for the dequantized residual value; and
based on the level for the dequantized residual value and the sign for the dequantized residual value, determine the dequantized residual value.

30. The device of claim 29, wherein the one or more processors are further configured to:
determine a residual block for the block of video data, wherein the residual block comprises the dequantized residual value;
add the residual block to a prediction block for the block of video data to determine a reconstructed block for the block of video data;
generate a picture of decoded video data based on the reconstructed block; and
output the picture of decoded video data.

31. The device of claim 28, wherein a first interval of the k intervals includes values ranging from 1 to a first threshold, wherein the one or more processors are further configured to:
receive a syntax element indicating that the level for the quantized residual value is greater than zero.

32. The device of claim 28, wherein a first interval of the k intervals includes values ranging from 2 to a first threshold, wherein the one or more processors are further configured to:
receive a syntax element indicating that the level for the quantized residual value is greater than zero;
receive a syntax element indicating that the level for the quantized residual value is greater than one.

33. The device of claim 28, wherein the one or more processors are further configured to:
  for a first interval of the k intervals, receive a syntax element indicating that the level for the quantized residual value is greater than values included in the first interval;
  for a second interval of the k intervals, receive a syntax element indicating that the level for the quantized residual value is included in the second interval;
  wherein the syntax element indicating the difference value indicates a difference between a reference level value for the second interval and the level for the quantized residual value of the block of video data.

34. The device of claim 28, wherein the one or more processors are further configured to:
  receive, for respective intervals of the k intervals, flags indicating that the level for the quantized residual value is greater than values included in the respective intervals for the flags until receiving a flag indicating the level for the quantized residual value is within an interval associated with the flag.

35. The device of claim 28, wherein the k intervals include an interval ranging from 0 to a first threshold, an interval ranging from the first threshold plus 1 to a second threshold, and an interval ranging from the second threshold plus 1 to a third threshold, wherein the one or more processors are further configured to:
  determine the first threshold, the second threshold, and the third threshold based on the quantization parameter.

36. The device of claim 28, wherein the k intervals include an interval ranging from 1 to a first threshold, an interval ranging from the first threshold plus 1 to a second threshold, and an interval ranging from the second threshold plus 1 to a third threshold, wherein the one or more processors are further configured to:
  determine the first threshold, the second threshold, and the third threshold based on the quantization parameter.

37. The device of claim 28, wherein the k intervals include an interval ranging from 2 to a first threshold, an interval ranging from the first threshold plus 1 to a second threshold, and an interval ranging from the second threshold plus 1 to a third threshold, wherein the one or more processors are further configured to:
  determine the first threshold, the second threshold, and the third threshold based on the quantization parameter.

38. The device of claim 37, wherein the k intervals include an interval ranging from the third threshold plus 1 to the maximum possible level for the levels of quantized residual values of the block of video data.

39. The device of claim 28, wherein the k intervals include the following intervals:
  $[2, t_1]$, $[t_1+1, t_2]$, $[t_2+1, t_3]$, $[t_{k-2}+1, t_{k-1}]$, $[t_{k-1}+1, \text{maxTsLevel}]$, wherein maxTsLevel represents the maximum possible level for the levels of quantized residual values of the block of video data based on the quantization parameter for the block of video data, and wherein $t_n$ represents an upper threshold for the n-th interval, wherein n ranges from 0 to k−1.

40. The device of claim 28, wherein the one or more processors are further configured to:
  bypass decode the syntax element indicating the difference value.

41. The device of claim 28, wherein the device comprises a wireless communication device, further comprising a receiver configured to receive encoded video data and a display configured to display the decoded video data.

42. The device of claim 41, wherein the wireless communication device comprises a telephone handset and wherein the receiver is configured to demodulate, according to a wireless communication standard, a signal comprising the encoded video data.

43. The device of claim 28, wherein the k intervals include the following intervals:
  $[X, t_1]$, $[t_1+1, t_2]$ $[t_{k-2}+1, t_{k-1}]$, $[t_{k-1}+1, \text{maxTsLevel}]$, wherein X represents a minimum value for interval k=0, wherein maxTsLevel represents the maximum possible level for the levels of quantized residual values of the block of video data based on the quantization parameter for the block of video data, and wherein $t_n$ represents an upper threshold for the n-th interval, wherein n ranges from 0 to k−1.

44. A device for encoding video data, the device comprising:
  a memory configured to store video data; and
  one or more processors configured to:
    determine that a block of video data is encoded without transforming residual data for the block;
    determine a level for a quantized residual value of the block of video data;
    determine a quantization parameter for the block of video data;
    based on the determined quantization parameter, determine a range for levels of quantized residual values of the block of video data, wherein the range goes from zero to a maximum possible level for the levels of quantized residual values of the block of video data;
    divide the range into k intervals, wherein k is an integer value, each interval includes multiple levels for quantized residual values, and each interval has an associated index value between 0 and k−1;
    determine a particular interval of the k intervals that includes the level for the quantized residual value;
    determine a difference value, wherein the difference value represents a difference between a reference level value for the particular interval and the level for the quantized residual value of the block of video data;
    signal the level for the quantized residual value of the block of video data based on the k intervals, wherein to signal the level for the quantized residual value of the block of video data based on the k intervals the one or more processors are further configured to:
      generate, for inclusion in the bitstream of encoded video data, one or more syntax elements indicating an associated index value of the particular interval;
      generate, for inclusion in the bitstream of encoded video data, a syntax element indicating the difference value; and
    output the bitstream of encoded video data.

45. The device of claim 44, wherein to determine the level for the quantized residual value of the block of video data, the one or more processors are further configured to:
  determine a level for a residual value; and
  quantize the level for the residual value to determine the level for the quantized residual value.

46. The device of claim 45, the one or more processors are further configured to: generate, for inclusion in the bitstream of encoded video data, a syntax element indicating a sign for the residual value.

47. The device of claim 44, wherein a first interval of the k intervals includes values ranging from 1 to a first threshold, wherein the one or more processors are further configured to:
generate, for inclusion in the bitstream of encoded video data, a syntax element indicating that the level of the quantized residual value is greater than zero.

48. The device of claim 44, wherein a first interval of the k intervals includes values ranging from 2 to a first threshold, wherein the one or more processors are further configured to:
generate, for inclusion in the bitstream of encoded video data, a syntax element indicating that the level for the quantized residual value is greater than zero;
generate, for inclusion in the bitstream of encoded video data, a syntax element indicating that the level for the quantized residual value is greater than one.

49. The device of claim 44, wherein the one or more processors are further configured to:
for a first interval of the k intervals, generate, for inclusion in the bitstream of encoded video data, a syntax element indicating that the level for the quantized residual value is greater than values included in the first interval;
for a second interval of the k intervals, generate, for inclusion in the bitstream of encoded video data, a syntax element indicating that the level for the quantized residual value is included in the second interval;
wherein the syntax element indicating the difference value indicates a difference between a reference level value for the second interval and the level for the quantized residual value of the block of video data.

50. The device of claim 44, wherein the one or more processors are further configured to:
generate, for inclusion in the bitstream of encoded video data, for respective intervals of the k intervals, flags indicating that the level for the quantized residual value is greater than values included in the respective intervals for the flags until generating, for inclusion in the bitstream of encoded video data, a flag indicating the level for the quantized residual value is within an interval associated with the flag.

51. The device of claim 44, wherein the k intervals include an interval ranging from 0 to a first threshold, an interval ranging from the first threshold plus 1 to a second threshold, and an interval ranging from the second threshold plus 1 to a third threshold, wherein the one or more processors are further configured to:
determine the first threshold, the second threshold, and the third threshold based on the quantization parameter.

52. The device of claim 44, wherein the k intervals include an interval ranging from 1 to a first threshold, an interval ranging from the first threshold plus 1 to a second threshold, and an interval ranging from the second threshold plus 1 to a third threshold, wherein the one or more processors are further configured to:
determine the first threshold, the second threshold, and the third threshold based on the quantization parameter.

53. The device of claim 44, wherein the k intervals include an interval ranging from 2 to a first threshold, an interval ranging from the first threshold plus 1 to a second threshold, and an interval ranging from the second threshold plus 1 to a third threshold, wherein the one or more processors are further configured to:
determine the first threshold, the second threshold, and the third threshold based on the quantization parameter.

54. The device of claim 53, wherein the k intervals include an interval ranging from the third threshold plus 1 to the maximum possible level for the levels of quantized residual values of the block of video data.

55. The device of claim 44, wherein the k intervals include the following intervals:
$[2, t_1], [t_1+1, t_2], [t_2+1, t_3], [t_{k-2}+1, t_{k-1}], [t_{k-1}+1, \text{maxTsLevel}]$, wherein maxTsLevel represents the maximum possible level for the levels of quantized residual values of the block of video data based on the quantization parameter for the block of video data, and wherein $t_n$ represents an upper threshold for the n-th interval, wherein n ranges from 0 to k−1.

56. The device of claim 44, wherein the one or more processors are further configured to:
bypass encode the syntax element indicating the difference value.

57. The device of claim 44, wherein the device comprises a wireless communication device, further comprising a transmitter configured to transmit encoded video data.

58. The device of claim 57, wherein the wireless communication device comprises a telephone handset and wherein the transmitter is configured to modulate, according to a wireless communication standard, a signal comprising the encoded video data.

59. A non-transitory computer readable storage medium storing instructions that when executed by one or more processors cause the one or more processors to determine that a block of video data is encoded without transforming residual data for the block;
determine a quantization parameter for the block of video data;
based on the determined quantization parameter, determine a range for levels of quantized residual values of the block of video data, wherein the range goes from zero to a maximum possible level for the levels of quantized residual values of the block of video data;
divide the range into k intervals, wherein k is an integer value, each interval includes multiple levels for quantized residual values, and each interval has an associated index value between 0 and k−1;
determine a level for a quantized residual value of the block of video data based on the k intervals, wherein to determine the level for the quantized residual value of the block of video data based on the k intervals, the instructions cause the one or more processors to:
receive information indicating an index corresponding to a particular interval of the k intervals within which the level for the quantized residual value falls;
receive information indicating a difference value, wherein the difference value represents a difference between a reference level value for the particular interval and the level for the quantized residual value of the block of video data; and
based on the reference level value and the difference value, determine the level for the quantized residual value; and
output decoded video data based on the level for the quantized residual value.

60. An apparatus for decoding video data, the apparatus comprising:
means for determining that a block of video data is encoded without transforming residual data for the block;
means for determining a quantization parameter for the block of video data;

means for determining a range for levels of quantized residual values of the block of video data based on the determined quantization parameter, wherein the range goes from zero to a maximum possible level for the levels of quantized residual values of the block of video data;

means for dividing the range into k intervals, wherein k is an integer value, each interval includes multiple levels for quantized residual values, and each interval has an associated index value between 0 and k−1;

means for determining a level for a quantized residual value of the block of video data based on the k intervals, wherein the means for determining the level for the quantized residual value of the block of video data based on the k intervals comprises:

- means for receiving information indicating an index corresponding to a particular interval of the k intervals within which the level for the quantized residual value falls;
- means for receiving information indicating a difference value, wherein the difference value represents a difference between a reference level value for the particular interval and the level for the quantized residual value of the block of video data; and
- means for determining the level for the quantized residual value based on the reference level value and the difference value; and means for outputting decoded video data based on the level for the quantized residual value.

\* \* \* \* \*